May 17, 1927.
W. FAIRBANKS
JUMPING ROPE
Filed March 4, 1926
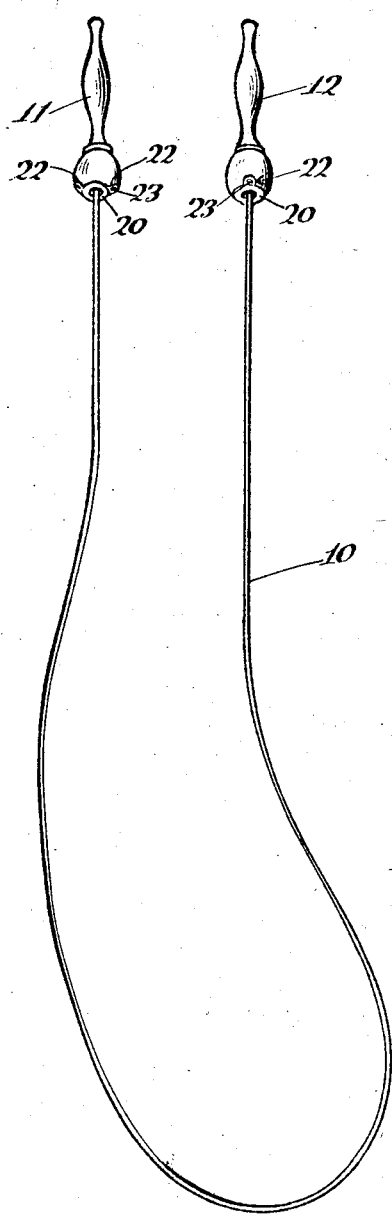
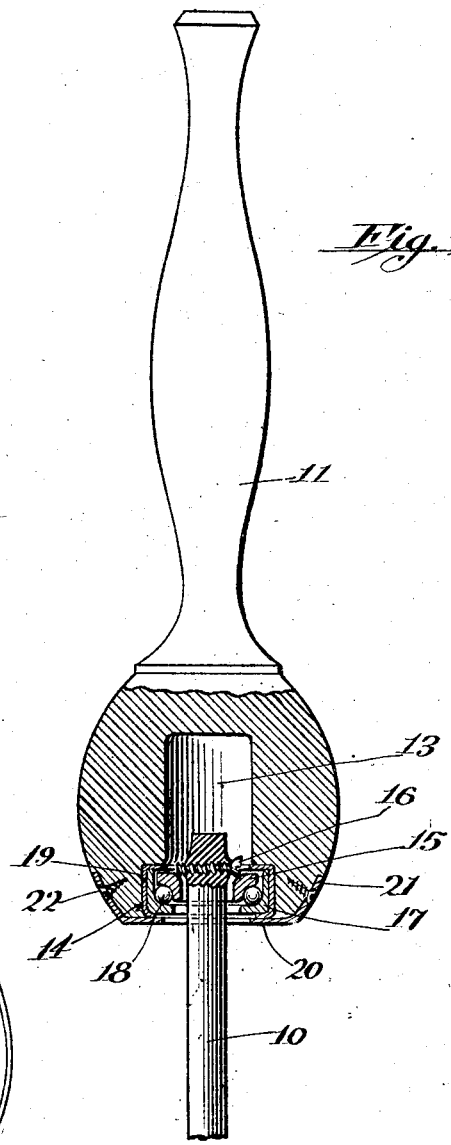
Inventor:
William Fairbanks.
by Hazard and Miller
Attorneys.

Patented May 17, 1927.

1,629,209

UNITED STATES PATENT OFFICE.

WILLIAM FAIRBANKS, OF LOS ANGELES, CALIFORNIA.

JUMPING ROPE.

Application filed March 4, 1926. Serial No. 92,218.

This invention relates to improvements in jumping ropes. In gymnasiums and the like it is highly desirable in some circumstances to provide what is commnly referred to as a fast jumping rope for athletic and training purposes. In constructing such a jumping rope, it is very advantageous to provide an anti-friction swivel connection between the flexible element of the jumping rope and its handles so as to permit the ends of the rope to turn with respect to the handles and thus eliminate any tendency of the rope to twist and slow down.

An object of this invention is to provide an improved jumping rope wherein there is an anti-friction bearing forming a swivel connection between the ends of the flexible element of the jumping rope and its handles.

A further object of this invention is to provide an improved jumping rope which is of simple yet durable construction having few parts to get out of order and which cannot be damaged through lack of ordinary care.

With the foregoing and other objects in view which will be made manifest in the following detailed description and specifically pointed out in the appended claims, reference is had to the accompanying drawings for an illustrative embodiment of the invention, wherein:

Figure 1 is a perspective view illustrating the improved jumping rope, and

Fig. 2 is a partial view in side elevation illustrating the connection between the flexible element and one of the handles, parts of the view being broken away and shown in vertical section.

Referring to the accompanying drawings wherein similar reference characters designate similar parts throughout, the improved jumping rope consists of a flexible element 10 preferably formed of a strip of leather, although other suitable materials can be employed, if desired. There are also provided two handles 11 and 12 for the ends of the flexible element 10. These handles can either be formed of a single piece of wood or composition or a plurality of pieces, if desired. In each of the handles there is formed a recess, the inner end 13 of which is somewhat smaller than the outer end 14. Each end of the flexible element 10 extends into its corresponding recess in its respective handle. A bearing race 15 is positioned in the recess and the end of the flexible element extends through the bearing race. It is kept from being withdrawn from the bearing race 15 in any suitable manner, such as by a screw 16 extending diametrically through the end of the leather thong 10 and engaging upon the bearing race. A similar bearing race 17 is also positioned within the recess about the end of the flexible element 10 and this is arranged outwardly of the first mentioned bearing race 15. Balls 18 are positioned between the bearing races 15 and 17 and thus form an anti-friction bearing. The two bearing races 15 and 17 are generally angular in cross section, although their opposed surfaces which are engaged by the balls 18 are curved or rounded more or less complementary to the balls 18. A cage 19 in the form of an annular channel substantially encloses the two races and the balls. This cage is maintained in the recess by means of a washer 20 positioned on the handle over the outer end of the recess and confining the cage therein. The washer 20 has ears 21 which are preferably recessed in the body of the handle and screws 22 pass through them so as to secure it to the handle.

By the improved construction it will be readily appreciated that on swinging the jumping rope, the ends of the flexible element will tend to be withdrawn from within the recess by centrifugal action. This withdrawal, however, is prevented by the anti-friction bearing formed by the races 15 and 17 and the balls 18. Not only does this anti-friction bearing serve to secure the ends of the flexible element 10 to the handles, but it also permits rotation of the flexible element relatively to the handle so that any tendency of the flexible element to twist is effectively prevented, it being understood that such twisting causes a slowing down of the speed at which the rope can be turned.

From the improved construction it will be readily understood that an extremely fast and satisfactory jumping rope is provided which has very few parts which can get out of order, and practically no care is required to keep the device in proper working condition.

It will be understood that various changes in the detail of construction may be made without departing from the spirit or scope of the invention as defined by the appended claims.

I claim:

1. A jumping rope comprising a pair of handles having recesses therein, a flexible element having its ends extending into said recesses, an angular bearing race adapted to support the end of the flexible element within its respective recess, a second angular bearing race disposed within each recess about the flexible element, balls disposed between the races, a cage enclosing the races and balls within each handle, and means for securing each cage within its respective recess.

2. A jumping rope comprising a pair of handles having recesses therein, a flexible element having its ends extending into said recesses, an angular bearing race adapted to support the end of the flexible element within its respective recess, a second angular bearing race disposed within each recess about the flexible element, balls disposed between the races, a cage enclosing the races and balls within each handle, and means for securing each cage within its respective recess comprising a washer positioned about a flexible element over the outer end of each recess so as to maintain the cage therein and means for securing each washer to its respective handle.

In testimony whereof I have signed my name to this specification.

WILLIAM FAIRBANKS.